United States Patent
Kraus et al.

(10) Patent No.: US 11,928,755 B2
(45) Date of Patent: Mar. 12, 2024

(54) INTEGRATING PREDETERMINED VIRTUAL TOURS FOR REAL-TIME DELIVERY ON THIRD-PARTY RESOURCES

(71) Applicant: Threshold 360, Inc., Tampa, FL (US)

(72) Inventors: Daniel Kraus, Port Charlotte, FL (US); Sean Kovacs, Tampa, FL (US)

(73) Assignee: Threshold 360, Inc., Tampa, FL (US)

( * ) Notice: Subject to any disclaimer, the term of this patent is extended or adjusted under 35 U.S.C. 154(b) by 55 days.

(21) Appl. No.: 17/676,008

(22) Filed: Feb. 18, 2022

(65) Prior Publication Data

US 2022/0270201 A1   Aug. 25, 2022

Related U.S. Application Data

(60) Provisional application No. 63/151,489, filed on Feb. 19, 2021.

(51) Int. Cl.
| | |
|---|---|
| *G06F 3/048* | (2013.01) |
| *G06F 3/04845* | (2022.01) |
| *G06T 1/60* | (2006.01) |
| *H04L 65/612* | (2022.01) |
| *H04N 13/183* | (2018.01) |
| *H04N 13/194* | (2018.01) |
| *H04N 13/282* | (2018.01) |
| *G06F 3/04817* | (2022.01) |

(52) U.S. Cl.
CPC ............ *G06T 1/60* (2013.01); *G06F 3/04845* (2013.01); *H04L 65/612* (2022.05); *H04N 13/183* (2018.05); *H04N 13/194* (2018.05); *H04N 13/282* (2018.05); *G06F 3/04817* (2013.01); *G06T 2200/16* (2013.01)

(58) Field of Classification Search
CPC ............ G06F 3/04845; G06F 3/04815; G06F 3/0488; G06F 3/04817; G06F 3/011; G06F 3/016; H04L 65/612; H04L 65/762; H04L 65/764; H04L 65/80; H04L 65/1069; H04N 13/183; H04N 13/194; H04N 13/282; H04N 23/698; G06T 1/60; G06T 2200/16

See application file for complete search history.

(56) References Cited

U.S. PATENT DOCUMENTS

| | | | | |
|---|---|---|---|---|
| 10,281,293 | B2* | 5/2019 | Musabji | G06T 11/00 |
| 10,924,627 | B2* | 2/2021 | Weems, III | G06F 3/011 |
| 11,128,794 | B2* | 9/2021 | Merati | G06T 11/60 |
| 2014/0189477 | A1* | 7/2014 | Weems, III | G06F 3/011 |
| | | | | 715/205 |
| 2019/0037134 | A1* | 1/2019 | Merati | G06T 11/60 |

* cited by examiner

*Primary Examiner* — Vijay Shankar
(74) *Attorney, Agent, or Firm* — Foley & Lardner LLP

(57) ABSTRACT

Integrating virtual tours on digital resources is provided. A system receives a call generated by a client application executed on a client device responsive to a refresh of a digital resource. The system identifies a request for content for display in a content slot on the digital resource having a content slot size. The system transmits, to the client device, a viewer application configured to execute a priority caching function in the content slot. The viewer application downloads, based on the priority caching function and a computing characteristic of the client device, a first portion of a virtual tour. The viewer application renders the first portion of the virtual tour via the content slot. The viewer application establishes a controller that controls rendering of the virtual tour in response to a detection of an interaction on the digital resource outside the content slot.

20 Claims, 12 Drawing Sheets

INTEGRATING PREDETERMINED VIRTUAL TOURS FOR REAL-TIME DELIVERY ON THIRD-PARTY RESOURCES

CROSS-REFERENCES TO RELATED APPLICATIONS

This application claims the benefit of priority under 35 U.S.C. § 119 to U.S. Provisional Patent Application No. 63/151,489, filed Feb. 19, 2021, which is hereby incorporated by reference herein in its entirety.

FIELD OF THE DISCLOSURE

This disclosure generally relates to integrating predetermined virtual tours for real-time delivery on third-party resources.

BACKGROUND OF THE DISCLOSURE

Client devices can access resources, such as digital resources. Accessing or loading the digital resource can trigger a request for a supplementary content item from a content delivery system. The content delivery system can select and transmit the supplementary content item for presentation with the digital resource on the client device. However, due to limited network bandwidth and other resource constraints, it can be challenging to deliver certain types of content or certain formats of content in an efficient manner without introducing delays, latency or using excessive computing resources.

SUMMARY OF THE DISCLOSURE

Systems and methods of this technical solution are generally directed to integrating predetermined virtual tours for real-time delivery on third-party resources. The technical solution can facilitate the creation, integration and delivery of virtual tour elements as supplementary content items on third-party resources. For example, this technical solution can provide a virtual tour as an advertisement for presentation on a digital resource provided by a digital resource publisher.

At least one aspect is directed to a system for integrating virtual tours on digital resources. The system can include a data processing system having at least one processor coupled to memory. The data processing system can receive, via a network, a call generated by a client application. The client application can be executed on a client device. The client application can generate the call responsive to a refresh of a digital resource. The data processing system can identify, based on the call, a request for content for display in a content slot on the digital resource having a content slot size. The data processing system can transmit, to the client device responsive to the request, a viewer application configured to execute a priority caching function in the content slot. The viewer application can download, based on the priority caching function and a computing characteristic of the client device, a first portion of a virtual tour. The viewer application can render the first portion of the virtual tour via the content slot. The viewer application can establish, for the rendered first portion of the virtual tour downloaded based on the priority caching function, a controller that controls rendering of the virtual tour in response to a detection of an interaction on the digital resource outside the content slot.

In some embodiments, the data processing system can receive the call generated by the client application responsive to the client application receiving an instruction to request the content from a content selection system separate from the data processing system and the client device. The call can include an identifier corresponding to the virtual tour.

The data processing system can transmit the viewer application to the client application with a command to cause the viewer application to automatically play the virtual tour independent of any detection of interactions on the digital resource. The virtual tour can include panoramic images captured by one or more cameras and connected to form a sequence frames. The viewer application can traverse the virtual tour along a path taken by the camera to prevent branching events off of the path.

The data processing system can select, based on the priority caching function and the computing characteristic, a highest priority portion of the virtual tour for transmission to the viewer application. The data processing system can select, subsequent to the selection of the highest priority portion, a second highest priority portion of the virtual tour for transmission to the viewer application. The computing characteristic can include a bandwidth of a connection via the network between the client device and the data processing system.

The controller can provide an icon for display via the content slot. The controller can detect, via a user interface of the client device, the interaction on the digital resource based on a click-down event corresponding to the icon. In some embodiments, the controller can adjust a direction of the virtual tour responsive to detection of the interaction. The controller can pause the virtual tour responsive to the detection of the interaction. The controller can invoke, responsive to the pause, a 360 degree view function of the virtual tour.

The data processing system can provide, to the viewer application, a content item. The content item can include a single frame that is separate from the virtual tour to cause the viewer application to overlay the content item on the virtual tour at a time stamp as the virtual tour is played in the content slot. The content item can be configured to redirect the client application to at least one of a second virtual tour or a second digital resource.

The data processing system can receive, from the viewer application, performance data corresponding to the render of the virtual tour on the digital resource. The data processing system can modify, based on the performance data, the priority caching function to adjust a priority of one or more portions of the virtual tour responsive to the performance data. The performance data can include at least one of a type of interaction, an interaction time, a mouse-down time, or a total view time.

At least one aspect is directed to a method for integrating virtual tours on digital resources. The method can be performed by a data processing system including at least one processor coupled to memory. The method can include the data processing system receiving, via a network, a call generated by a client application executed on a client device responsive to a refresh of a digital resource. The method can include the data processing system identifying, based on the call, a request for content for display in a content slot on the digital resource having a content slot size. The method can include the data processing system transmitting, to the client device responsive to the request, a viewer application configured to execute a priority caching function in the content slot to. The viewer application can download, based on the priority caching function and a computing characteristic of the client device, a first portion of a virtual tour. The viewer application can render the first portion of the virtual tour via the content slot. The viewer application can establish, for the rendered first portion of the virtual tour downloaded based on the priority caching function, a controller that controls rendering of the virtual tour in response to a detection of an interaction on the digital resource outside the content slot.

In some embodiments, the method can include the data processing system receiving the call generated by the client application responsive to the client application receiving an instruction to request the content from a content selection system separate from the data processing system and the client device. The call can include an identifier corresponding to the virtual tour.

The method can include the data processing system transmitting the viewer application to the client application with a command to cause the viewer application to automatically play the virtual tour independent of any detection of interactions on the digital resource. The virtual tour can include panoramic images captured by one or more cameras and connected to form a sequence frames. The viewer application can traverse the virtual tour along a path taken by the camera to prevent branching events off of the path.

The method can include the data processing system selecting, based on the priority caching function and the computing characteristic, a highest priority portion of the virtual tour for transmission to the viewer application. The method can include the data processing system selecting, subsequent to the selection of the highest priority portion, a second highest priority portion of the virtual tour for transmission to the viewer application. The computing characteristic can include a bandwidth of a connection via the network between the client device and the data processing system.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims

DETAILED DESCRIPTION OF THE DISCLOSURE

Systems and methods of this technical solution are generally directed to integrating predetermined virtual tours for real-time delivery on third-party resources. The technical solution can facilitate the creation, integration and delivery of virtual tour elements as supplementary content items on third-party resources. For example, this technical solution can provide a virtual tour as an advertisement for presentation on a digital resource provided by a digital resource publisher.

Figure 4:
FIG. 4 depict example dimensions for virtual tours delivered on third-party resources, in accordance with implementations.

The virtual tour can include a set of independent panoramic images (or video media), connected together into cohesive experiences through a back-end system, such as a data processing system. For interactive delivery in the form of an advertisement on a digital resource, the virtual tour can be retargeted into a lower-feature viewer. The lower-feature viewer can be integrated into a predetermined advertisement slot size (e.g., as depicted in FIG. 4), which can be passed through an advertisement delivery network for delivery as part of a banner advertisement, for example. The integration of a virtual tour element can transform the function of the advertisement to become interactive, and increase engagement or click through rates without introducing delays, latency, or excessive consumption of computing or network resources.

To do so, the data processing system of this technical solution can deliver a viewer for the virtual tour and then cause the incremental download of the static images or other content of the virtual tour. For example, when a client device access a digital resource, a call can be made via a script on the digital resource (e.g., JavaScript) or iFrame to the data processing system. Responsive to the call, the data processing system can provide a viewer and a data stream. The data processing system can initially provide 4-6 static images so as not to introduce latency or delay, or consume excessive network bandwidth. The viewer can be loaded in a container or an iframe on the digital resource.

The viewer can be configured to render the content stream and provide interactivity. The viewer can be loaded on the client device and configured to automatically present, render, execute, or otherwise play the content or data stream corresponding to the virtual tour. The viewer can have a passive or active mode. The viewer can allow additional functions related to an advertisement, such as hotspots.

Thus, the data processing system of this technical solution can integrate interactive virtual tours into banner advertisements that incorporate both auto-playback and various interaction methods. The technical solution can facilitate attribution by measuring engagement and usage of the transmitted content by the user via the client device, including, for example, interaction, interaction time, number of users (uniques), mouse-down time, total view time, etc. The technical solution can automate delivery of the interactive viewer, which can download the data stream corresponding to the virtual dour. The technical solution can provide a progressive priority caching function to that can download the priority elements first (immediately-visible image), followed by 2nd-tier priority content, thereby reducing latency or delays while minimizing network bandwidth utilization. The data processing system can provide follow-on connections including interactive elements that allow a user to control the virtual tour in forward and reverse motion through a panoramic sequence. The viewer can detect mouse down interactivity outside a frame, and maintain click-down image control when an input (e.g., mouse of touch input) is outside the frame or window. The viewer of this technical solution can integrate a brand or logo with the viewer.

Figure 1A:
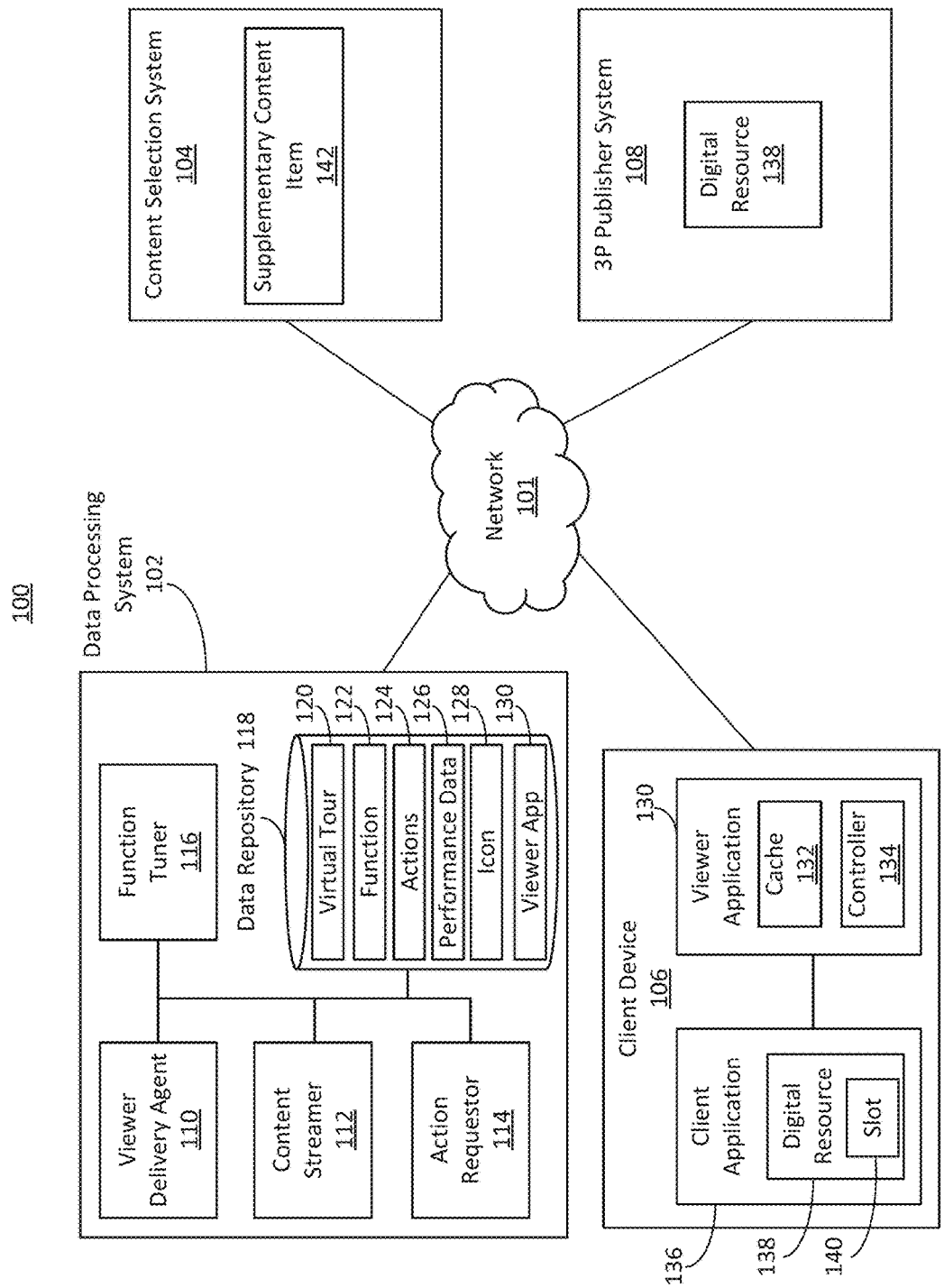
FIG. 1A depicts a block diagram of an illustrative system for integrating predetermined virtual tours for real-time delivery on third-party resources, in accordance with an implementation.

Referring now to FIG. 1A, a block diagram of an illustrative system for integrating predetermined virtual tours for real-time delivery on third-party resources, in accordance with an implementation, is shown. In brief overview, the system 100 can include a data processing system 102. The data processing system 102 can interface, communicate, control, or otherwise access one or more of a content selection system 104, third-party ("3P") publisher system 108 or client device 106. For example, a client device 106 can access a digital resource or resource provided by a 3P publisher system 108 via network 101. Accessing the digital resource can trigger a script that requests supplementary content, such as an advertisement, from the content selection system 104. The content selection system 104 can select a content item with HTML code or other link or reference to a virtual tour provided by the data processing system 102. The client device 106 (e.g., client application) can execute the HTML to access the referenced code and download a viewer application and data stream from the data processing system 102. The data processing system 102 can provide a viewer application 130 in a mode optimized or configured for delivery and execution in an advertisement slot on a digital resource. In some cases, the data stream can be limited to 4-6 images at a time to satisfy file size limits established by a client application. For example, the data processing system 102 can determine the number of images to limit the data stream to based on a priority caching function. Using the viewer application presented by the client device 106, the user can interact with the virtual tour by panning, moving forward, or in reverse through a predetermined sequence of images. The data processing system 102 can create and integrate the virtual tour, including the sequence of panoramic images.

The network 101 can be used by one or more system or component depicted in FIG. 1A to access information resources such as virtual tours 120 stored in the data processing system 102, digital resources 138 stored in the 3P publisher system 108, content items, web pages, web sites, domain names, or uniform resource locators that can be provided, output, rendered, or displayed by the client device 106. For example, via the network 101 a user of the client device 106 can request a web page from the 3P publisher system 108, which can trigger a request for a supplementary content item 142 from the content selection system 104, which can trigger a request for a viewer application from the data processing system 102 and a virtual tour 120 from the data processing system 102.

The network 101 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 101 may include a wireless link, such as an infrared channel or satellite band. The topology of the network 101 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

Still referring to FIG. 1A, and in further detail, the client device 106 can include, execute, host, or otherwise provide a client application 136. The client application 136 can refer to or include, for example, one or more of a web browser, native application, network application, software-as-a-service application, or mobile application. The client application 136 can include or be configured with a communication protocol or network interface to communicate with computing devices via the network 101. A user of the client device 106 can launch, invoke, execute, or otherwise access the client application 136. The client application 136 can query, communicate, or otherwise request a digital resource 138 (e.g., a web page, online document, digital video, multimedia content, or other digital or electronic content) from a data source (e.g., a 3P publisher system 108) via the network 101.

The client device 106 can receive the digital resource 138, and render the digital resource via the client application 136. Rendering the digital resource 138 can include, for example, executing or running the code forming the digital resource 138. Rendering the digital resource 138 can include, for example, displaying a web page or online document via a display device, or other interface, communicatively coupled to the client device 106. When rendering the digital resource, or upon rendering the digital resource 138, the client application 136 can execute a script associated with or incorporated in the digital resource 138. The script can include a request or trigger for supplementary digital content. This supplementary digital content may be provided by an entity that is different from the 3P publisher system 108. The supplementary digital content may not be predetermined or known at the time of rendering the digital resource 138. For example, the digital resource 138 can be configured with a script to generate a call with a request for supplementary content. The script of the digital resource 138 can cause the client application 136 to transmit the request or call to the content selection system 104 via network 101. The call can refer to or include a request in a request-response protocol between a client and server, such as client application 136 sending an HTTP request to a 3P publisher system 108 or content selection system 104. The 3P publisher system 108 or content selection system 104 can return a response to the client application 136, which can include status information about the request and the requested content.

The digital resource 138 can include one or more slots 140. Slots 140 can refer to or include content item slots, content slots, or iFrames, placeholders portions, or fillable portions. The client application 136 can refresh the digital resource. Refreshing the digital resource can refer to or include initially downloading and rendering the digital resource 138 via the client application 136. Refreshing the digital resource can refer to or include re-loading or re-rendering the digital resource 138, for example by selecting a refresh button provided by a graphical user interface of the client application 136.

To populate the content slot 140, the digital resource can be configured with a script that generates and transmits a call to a content selection system 104. The call or request for content can include parameters or information to facilitate or allow the content selection system 104 to select a content item or resource to populate the slot 140. The information can include, for example, an identifier of the digital resource (e.g., web page domain address), information about the client device 106 (e.g., location information), or other information associated with the client device 106 or web page that can facilitate performing content selection. The content selection system 104 can use any type of selection process and content selection criteria, including, for example, keyword-based matching, profile matching, similar users, semantic analysis, online digital auctions, location-based matching, etc. The content selection system 104 can include a repository of supplementary content items 142 provided by supplementary content providers (e.g., online advertisers) to be inserted in the slot 140 responsive to requests for supplementary content.

Upon selecting a supplementary content item 142 responsive to the request from the client application 136, the content selection system 104 can provide a URL, reference, pointer, code, or other information to the client application 136 to insert in the slot 140 of the digital resource 138. In some cases, the selected supplementary content item 142 can include a reference, URL, or code to render or play a virtual tour 120. In some embodiments, the virtual tour 120 may be in a format that is not playable in the slot 140 on the digital resource 138 by the client application 136. For example, the client application 136 may not be configured to natively play the virtual tour 120. In some cases, the client application 136 may not be configured with application programming interfaces ("APIs"), plug-ins, or a playback engine in order to play the virtual tour 120. In some embodiments, while the client application 136 may be configured to play the virtual tour 120, the client application 136 may be unable or not configured to play the virtual tour 120 without introducing delays, inefficiencies, latency, or skipped frames. For example, the client application 136 may negatively impact loading or performance of main content on the digital resource (e.g., an online article) by inadvertently prioritizing or downloading an entire virtual tour 120 and consuming the network bandwidth or processor capacity or memory capacity available to the client device 106.

To address one or more of these technical problems, this technical solution can include a data processing system 102 designed, constructed and operational to receive or intercept the request for the virtual tour 120 from the client application 136. The data processing system 102, responsive to the request for the virtual tour 120, can provide a viewer application 130 to the client device 106. The data processing system 102 can control, communicate or otherwise interface with the viewer application 130 to cause the client device 106 to execute the viewer application 130 on the client device 106 via the client application 136. The viewer application 130 can execute in the slot 140 on the digital resource 138 presented by the client application 136.

The system 100 can include at least one data processing system 102. The data processing system 102 can include at least one viewer delivery agent 110 that can transmit or provide viewer applications 130 to client devices 106. The data processing system 102 can include a content streamer 112 that can select portions of a virtual tour to provide using a progressing caching function, and accordingly transmit the selected portions of the virtual tour to the viewer application 130 executing on the client device 106. The data processing system 102 can include an action requester 114 that can generate, select or otherwise provide actions, prompts for actions, or call-to-action content for presentation via the viewer application 130. The data processing system 102 can include a function tuner 116 that can receive performance feedback associated with playback of the virtual tour 120, and then update a priority caching function 122 so as to reduce delays, latency, or consumption of excessive network bandwidth, processor or memory capacity on the client device 106.

The data processing system 102 can include a data repository 118. The data repository 118 can include or store virtual tours 120. A virtual tour 120 can include images. In some embodiments, the images can be panoramic or have a wide field of view. Panoramic images can refer to images having a wide view or sweeping view surrounding the observer. For example, the panoramic images can be captured with a horizontally elongated field of view or images that have a wide aspect ratio. For example, an image can be a panoramic image if the image captures a field of view of, for example, greater than or equal to 150 degrees width and, for example, 75 degrees height. An image can be panoramic if it has a width to height aspect ratio of at least 2:1 or twice as wide as it is high, for example. The panoramic images can be captured by one or more cameras, such as panoramic cameras. The panoramic images can be of a single location. The panoramic images can be of an indoor or outdoor location. For example, the panoramic images can correspond to or represent a tour or walking or traversing inside or through a museum, hotel, restaurant, retail store, resort, or other building or establishment. The panoramic images can correspond to or represent walking outside or through a campus, park, trail, etc.

The data processing system 102 can connect the panoramic images to form a sequence of frames. By connecting the panoramic images into a sequence of frames, the data processing system 102 can generate a virtual tour 120 of a location. The virtual tour 120 can be of a predetermined or fixed path. The virtual tour 120 can connect the panoramic images to generate a linear path through the location. A linear path through a location can refer to traversing through the location and playing or rendering or showing images of the location but from the perspective of the linear path. For example, the user may not be able to move off the predetermined linear path, except for at a predetermined branch location along the linear path. Thus, viewer application 130 can traverse the virtual tour 120 along a path taken by the camera to prevent branching events off of the path.

The data repository 118 can include a function 122. The function 122 can include a progressive caching function. The progressive caching function can determine computing characteristics of the client device 106. The computing characteristics can include an amount of network bandwidth available to the client device 106 via the network 101; processor capacity or utilization of the client device 106 (e.g., percent processor utilization), or memory utilization (e.g., amount of available memory, percentage of memory available or free, percentage of memory used, etc.). The content streamer 112, using the progressive caching function 122, can determine a number of frames or size of a portion of the virtual tour 120 to transmit based on computing characteristics of the client device 106.

The data repository 118 can include actions 124. Actions 124 can include call-to-actions, prompts, references, URLs, re-directs, surveys, etc. Action 124 can include multimedia content, audio content, visual content, haptic feedback content, etc. The data repository 118 include performance data 126. Performance data 126 can include, for example, at least one of a type of interaction, an interaction time, a mouse-down time, or a total view time of the virtual tour. Types of interactions can include, for example, whether the user reversed a portion of the virtual tour, selected a branch off point, allowed the virtual tour to automatically play and traverse along the predetermined linear path, paused the virtual tour, fast forwarded the virtual tour, or invoked a 360 degree view function of the viewer application. A mouse-down time can refer to a time stamp (e.g., a current time in the time zone of the client device 106, a time stamp relative to a duration of the virtual tour such as 10 seconds into the virtual tour, a frame number or identifier in the virtual tour, or a location point or identifier in the virtual tour). A mouse-down event can refer to when a user provides a selection or input via a user interface, such as a mouse, touchpad, touchscreen, gesture, or other user interface device. The total view time can refer to the amount of time the user viewed the virtual time, which can include reversing the virtual tour or pausing the virtual tour, in some embodiments. In some cases, the total view time can be the duration of the virtual tour.

The data repository 118 can include one or more icons 128. An icon can refer to a widget or user interface element provided via the controller 134 of the viewer application 130. The icon can include a scroll wheel, arrows, chevrons, or other user interface elements with which the user can provide input or interact with the virtual tour. The controller 134 can select an icon and present the icon via the viewer application 130.

The data repository 118 can include one or more viewer applications 130. The viewer application 130 can refer to a program, script, code, plug-in, or other tool or component that can render or play virtual tours 120 in a slot 140 on a digital resource 138. The viewer application 130 can include JavaScript code, for example. The viewer application 130 can include a controller 134 that can provide interactivity. In some cases, the data repository 118 can include different types of viewer applications 130. The different viewer application 130 can be customized or optimized for different types of virtual tours 130, different types of slots 140, different types of client applications 136, or different types of client devices 106. For example, the data processing system 102 can select and provide a viewer application 130 based on the type of operating system of the client device 106, the type of client application 136 (e.g., a web browser or native application), or size of the slot 140.

The data processing system 102 can include at least one logic device such as a computing device having a processor to communicate via the network 101, for example with the client device 106, content selection system 104, or 3P publisher system 108. The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The data processing system 102 can include a viewer delivery agent 110 designed, constructed and operational to provide a viewer application 130 to a client device 106. The viewer delivery agent 110 can receive a call or request from the client application 136 for a virtual tour 120 or action item associated with the virtual tour 120, such as an image or advertisement. However, rather than initially provide HTML or image or text in response to the request for content from the client application 136 to populate the slot 140, the data processing system 102, via the viewer delivery agent 110, can transmit a viewer application 130.

For example, the data processing system 102 can receive, via a network, a call generated by a client application 136 executed on a client device 106 responsive to a refresh or load of a digital resource 138 by the client application 136. The content selection system 104 can instruct the client application 136 to request the virtual tour from the data processing system 102. The content selection system 104 can be separate or different from the data processing system 102. The content selection system 104 can be administered by a different entity or organization than the data processing system 102. The content selection system 104 can be located on different servers that are remote from the servers of the data processing system 102.

The data processing system 102 can identify, based on the call, a request for content for display in a content slot 140 on the digital resource 138 having a content slot size. The request can include an identifier for the content selected by the content selection system 104. For example, the content selection system 104 can select a supplementary content item 142 that includes a URL, reference, pointer, or other identifier. The identifier in or of the supplementary content item 142 can cause the client application 136 to access or request the identified content from the data processing system 102. The data processing system 102, upon receiving the request or call, can perform a lookup in the data repository 118 to select a virtual tour 120. The data processing system 102 can identify or select the virtual tour 120 that corresponds to, maps to, or is otherwise assigned the identifier provided in the call from the client device 106.

The data processing system 102 can select the virtual tour 120 responsive to the call based on additional criteria. For example, the call or request from the client device 106 can include or indicate a size of the slot 140. Some example slot sizes are depicted in FIG. 4. The data processing system 102 can select a virtual tour 120 that is compatible with the size of the slot 140. In some embodiments, a virtual tour of a location can have different versions that are compatible with different formats. The virtual tour 120 can be stored in the data repository 118 with meta data indicating a slot sizes which the virtual tour is compatible, an identifier for a location, or other information that facilitates selection of the virtual tour 120 responsive to a call or request from the client application 136.

The data processing system 102 (e.g., via viewer delivery agent 110) can transmit a viewer application 130 to the client device 106. The data processing system 102 can transmit the viewer application 130 responsive to the request from the client device 106. In some embodiments, the viewer delivery agent 110 can transmit a standard or default viewer application 130 to the client application 136 for execution. In some cases, the viewer delivery agent 110 can select a viewer application 130 based on a policy, function, rule, or other logic. For example, the data repository 118 can include different versions of the viewer application 130. The different versions 130 can be tailored to, optimized for, or otherwise compatible with different types of client applications 136, slots 140, or client devices 106. For example, a first viewer application 130 can be configured or optimized to execute on a mobile application on a mobile device. A second viewer application 130 can be configured or optimized to execute on a desktop application on a desktop computer, for example. In another example, a third viewer application 130 can be configured or optimized to execute in a web browser. The different viewer applications 130 can be configured or optimized to run on respective operating systems of the respective client devices 106. In some cases, the viewer application 130 can be selected based on processor, memory or network bandwidth capabilities of the client device 106.

The viewer delivery agent 110 can transmit the viewer application 130 to the client application 136. The viewer delivery agent 110 can provide a command to cause the viewer application 130 to load in the slot 140 on the digital resource 138. The command can include a command or instruction to the viewer application 130 to automatically play the virtual tour 120 independent of any detection of interactions on the digital resource 138. For example, once the viewer application loads, the viewer application can download one or more portions of the virtual tour and render, present or otherwise play the virtual tour via the content slot 140. The viewer application 130, executing in the content slot 140, can render the one or more portions of the virtual tour.

To address, mitigate, minimize, or prevent issue related to delay, latency, excessive computing or network utilization, or otherwise negative impacts on the digital resource 138 or client application 136 or client device 106, this technical solution can be configured with a progressive caching function 122. In some cases, the data processing system 102 can include a content streamer 112 designed, constructed or operational to use the progressive caching function 122 to select a portion (e.g., a subset) of the virtual tour 120 to transmit to the viewer application 130 for initially rendering. In some cases, the viewer application 130 can be designed, constructed or operational to use the progressive caching function 122 to request a portion of the virtual tour 120 to download.

Whether the content streamer 112 or viewer application 130 use the progressive caching function, the content streamer 112 can provide the portion of the virtual tour based on the progressive caching function 122. To do so, the progressive caching function 122 can receive, as input, computing characteristics associated with the client device 106, client application 136, slot 140, or network 101. In some cases, the progressive caching function 122 can be configured with a default limit of frames or portion of the virtual tour to transmit to the client application 136. For example, the progressive caching function can be configured to select a predetermined number or percentage of a highest priority frames of the virtual tour. The highest priority frames can be an initial 4-6 frames that are to be rendered or played, for example. In some cases, the highest priority frames can include a border frame or a content frame (e.g., content frame 302 depicted in FIG. 3A). In some cases, the highest priority frames can be the first portion of the virtual tour or the first 2 seconds of the virtual tour, or other portion.

The progressive caching function can select a portion of the virtual tour that corresponds to the beginning of the linear path up to a first branch point. For example, the virtual tour can be a tour of a hotel lobby that includes a linear path and 3 branch points that each lead to a different room off of the hotel lobby. The progressive caching function can identify the branch points in the virtual tour 120, and determine that the highest priority portion as the portion of the virtual tour that is before the first branch point. The viewer application can automatically play the virtual tour along the linear path up until the first branch point independent of any user input or interaction. Accordingly, the content streamer 112, using the progressive caching function, can determine that the highest priority portion of the virtual tour is the portion between the starting location of the virtual tour up until the first branch point.

In some cases, the virtual tour can be configured to follow a certain branch path, in which case the progressive caching function can identify the predetermined branch path and connect it to the linear path for the purposes of prioritizing the portions to provide to the viewer application. For example, the virtual tour can be divided into hierarchy of groups of frames, where each higher group of frames has a higher priority or ranking. For example, the first group of frames can have a higher priority than the second group of frames, which can have a higher priority than the third group of frames. Each group of frames can have the same number of frames, or a different number of frames. The number of frames in a group of frames can vary based on the priority of the group. For example, a highest group of frames can have the fewest number of frames so as to minimize the introduction of delay or latency upon loading of the digital resource and automatic playback of the virtual tour. A second or third group of frames can contain a greater number of frames because the digital resource may already be loaded by the point in time at which a lower priority group of frames is to be rendered.

The limit of the number of frames in the group of frames can be set or determined based on the computing characteristics. For example, if the network bandwidth is low (e.g., 3G, less than 1 MB/s, etc.), then the limit can be 2 frames. If the network bandwidth is high (e.g., 5G, 10+ MB/s), then the number of frames can be 4-6 or more, for example.

Thus, viewer application 130 can download, based on the priority caching function and the computing characteristic of the client device, the first portion or highest priority portion of the virtual tour. The viewer application 130 can render the first portion of the virtual tour via the content slot. The system can select, subsequent to the selection of the highest priority portion, a second highest priority portion of the virtual tour for transmission to the viewer application.

The data processing system 102 can include an action requestor 114 designed, constructed and operational to provide interactive functionality for the virtual tour rendered via the viewer application 130. The action requestor 114 can provide a controller 134 designed, constructed and operational to control rendering of the virtual tour. In some cases, the controller 134 can be embedded included as part of the viewer application 130. The controller 134 can include or provide a graphical user interface element, such as an icon 128 depicted in FIG. 3A. The user interface element, or icon 128, can be used to interact with the controller 134. The controller 134 can detect interactions or receive input via a user interface of the client device 106 (e.g., a mouse input, touchpad, trackpad, touch interface, gesture, voice input, etc.).

The controller 134 can detect interactions on the digital resource outside the content slot 140. For example, a user can initially perform a mouse-down (e.g., click-down) event on the icon 128 for the controller 134 located in the viewer application 130 overlaid on the virtual tour 120. Thereafter, the user can move the mouse outside of the content slot. The client application 136 can associate the initial mouse down event with the controller 134 and continue to track the movement or location of the mouse throughout the digital resource or client application or operating system of the client device 106, and forward the tracking information to the controller 134 for further processing. The controller 134 can keep watching or tracking the mouse movement outside of the frame corresponding to the slot 140. Thus, the controller 134 can track the mouse cursor not only outside the slot 140, but also outside of the digital resource or client application.

For example, to do so, the controller 134 can be configured to detect when a mouse event starts, and then disable mouse events for the iFrame by setting a pointer-events CSS property to none when dragging starts, and then restore this setting to auto when dragging stops. In another example, the event.preventDefault( ) can be removed from a handleMouseDown function, to allow for movement of the controller icon when a cursor is outside an iFrame or even outside of the client application.

The controller 134, responsive to the input, can control playback or rendering of the virtual tour. For example, the controller 134 can reverse the direction of the playback of the virtual tour, step forward in the virtual tour, branch down a different path in the virtual tour, pause the virtual tour, restart the virtual tour, or perform a 360 degree functionality of the virtual tour.

In some cases, responsive to user input, the controller 134 can trigger the progressive caching function 122 to determine a next set of highest priority frames or portion of the virtual tour to download responsive to the input. In some cases, the viewer application 130 can maintain downloaded frames in a cache 132 of the client device 106. The viewer application 130 can maintain access to the cache 132 and maintain frames or portions of the virtual tour in the cache 132. The cache 132 may be limited in size, so older or low priority frames or portions of the virtual tour can be re-written or erased to accommodate higher priority frames or portions of the virtual tour. The priority of a portion of the virtual tour can be relative to which portion of the virtual tour is to be played back or rendered at the current time stamp or moment. Thus, if the controller 134 receives input to reverse playback, the controller 134 or viewer application 130 can access the cache 132 to determine of the frames that were previously rendered are still saved in cache, in which case the viewer application 130 can determine to render the frames from cache as opposed to downloading the frames from the data processing system 102. However, if the frames or portion of the virtual tour is not in the cache 132 is has been removed from cache 132, the viewer application 130 can trigger the progressive caching function 122 to determine which frames or portion of the virtual tour to download, and download the corresponding portion. Thus, the controller 134 can adjust a direction of the virtual tour responsive to detection of the interaction, or pause the virtual tour to invoke, responsive to the pause, a 360 degree view function of the virtual tour.

In some embodiments, the action requester 114 can provide, to the viewer application, a content item. The content item can be different from a supplementary content item 142 selected by the content selection system 104. The content item can refer to or include an action 124. The action 124 can include a content item with a call-to-action, prompt, survey, field, or other content to invoke or cause or request an engagement or interaction from the user. For example, the content item can include an action that, when selected or otherwise triggered, can cause the viewer application 130 to a download a different virtual tour 120 from the data processing system 120. The content item can include an action that, when selected or otherwise triggered, can cause the client application 136 to access a different digital resource. In some cases, triggering the action can cause the viewer application 130 to launch a new instance of the viewer application 130 to download and render a new virtual tour. In some cases, triggering the action can cause the client application 136 to launch a new instance of the client application 136 on the client device 106 and access a different digital resource 138 corresponding to the action, or access a different digital resource 136 with another viewer application 130 configured to render a virtual tour.

The content item can include a single frame that is separate from the virtual tour 120. The content item with the action can be a static image or frame. The content item or action can be overlaid on the virtual tour. The content item can be a banner content item that is located at a fixed location in the viewer application and that does not change as the virtual tour plays. For example, the content item 124 can be located at a portion of the viewer application 130 as depicted in FIGS. 3A-3E. To reduce network bandwidth usage, the content item can be a single frame or image that is overlaid on the different frames of the virtual tour without having to re-download the content item for each frame, thereby reducing remote procedure calls between the client device and the data processing system, as well as processor, memory and network utilization.

The data processing system 102 can include a function tuner 116. The function tuner 116 can be designed, constructed and operational to update, modify, tune, or adjust the progressive caching function 122. The function tuner 116 can receive performance data 126 from the viewer application 130. The performance data can indicate how or whether a user engaged or interacted with the virtual tour. The performance data can indicate how playback or rendering of the virtual tour performance. The performance data can indicate a level of performance of the virtual tour. The performance data can indicate or include memory, CPU, or network bandwidth utilization. The performance data can indicate an amount of time taken to render or begin playback of the virtual tour. The performance data can indicate whether any latency or delay was introduced into rendering of the digital resource 138 due to downloading a portion of the virtual tour. The performance data can indicate whether the virtual tour was refreshed, paused, reversed, or played a total duration of the virtual tour. In some cases, the performance data can indicate whether an action 124 was triggered.

The function tuner 116 can store the performance data 126 in data repository 118. The function tuner 116 can associate the performance data 126 with attributes of the client device 106, digital resource, size of the slot 140, or other information that can facilitate modifying, improving or tuning the function 1222.

For example, if the performance data 126 indicates that the virtual tour performed poorly (e.g., excessive latency or delay greater than a threshold such as 0.01 seconds, 0.1 seconds, 0.2 seconds, 0.3 seconds etc.), then the function tuner 116 can reduce the number of frames that are transmitted to the virtual tour at a given time. For example, if 10 frames of the virtual tour were initially selected for transmission to the viewer application 130, the function tuner 116 can update the function 122 to cause the function to select 5 frames to send to the viewer application 130 at a time. The function 122 can be updated for a particular digital resource, client device 106, virtual tour 130. The function 122 can be updated for a category of digital resources 138 (e.g., news web sites, video web sites, online game websites, etc.) or a category of client devices 106 (e.g., smartphones, laptops, tablets, or desktop computers), or a category of virtual tour (e.g., file size of virtual tour or images or duration).

Thus, the function tuner can modify, based on the performance data associated with rendering the virtual tour, the priority caching function to adjust a priority of one or more portions of the virtual tour responsive to the performance data. If the first 10 frames were grouped as a highest priority group, then the data processing system 102 can modify the function 122 such that the group of 10 frames is split up into two groups, with a first group of 5 maintaining a highest priority while the second group of 5 is demoted to a second highest priority, and the priorities of the subsequent groups of frames are reduced accordingly. As the function 122 is updated, the content streamer 112 can transmit groups of frames accordingly to the viewer application 130.

Figure 1B:
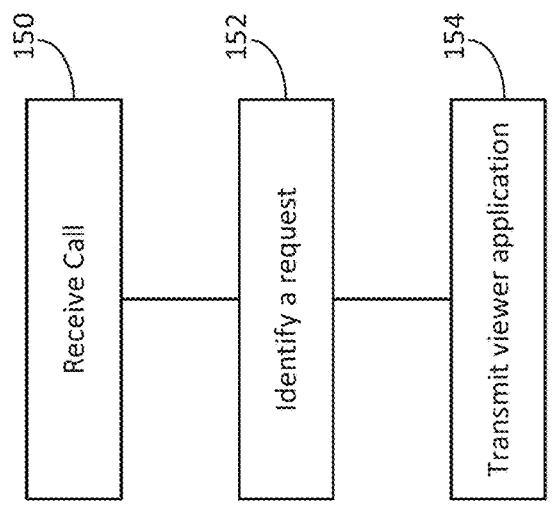
FIG. 1B depicts a flow chart for an example method of integrating predetermined virtual tours for real-time delivery, in accordance with an implementations.

FIG. 1B depicts a flow chart for an example method of integrating predetermined virtual tours for real-time delivery, in accordance with an implementations. The method 103 can be performed by one or more component or system depicted in FIG. 1A, including, for example, a data processing system, client device, or viewer application. In brief overview, at ACT 150, the method 103 includes receiving a call. At ACT 152, the method 103 includes identifying a request. At ACT 154, the method 103 includes transmitting a viewer application 154.

Still referring to FIG. 1B, and in further detail, the method 103 includes receiving a call at ACT 150. A data processing system can receive a call via a network from a client device. The data processing system can receive the call from a client application executing on the client device. The client application can generate or transmit the call to the data processing system. The client application can make the call to the data processing system responsive to an instruction received from a content selection system. The instruction can be embedded or included in a content item provided by the content selection system to the client application. The content item can include a URL or other reference or pointer or code that directs the client application to make a request for a virtual tour from the data processing system. In some cases, rather than the client application making the call to the data processing system, the content selection system can transmit a request to the data processing system for the virtual tour, and instruct the data processing system to provide the virtual tour and a viewer application to the client device.

At ACT 152, the data processing system can identify the request for content. The data processing system can identify a virtual tour that is identified in the request. For example, the request can include an identifier, filename, pointer, alphanumeric characters, deep link, or other indication of the virtual tour. In some cases, the request can include keywords. The keywords can be provided by the content selection system to the client application. The data processing system can receive the keywords from the client application and then perform a virtual tour selection process by which the data processing system can select a virtual tour from among several different virtual tours to provide to the client application. The data processing system can use the keywords in the request from the client application, as well as other selection criteria received from the client device or content selection system or 3P publisher system or digital resource. For example, the data processing system can select, based on keywords on a topic or other contextual information on the digital resource, a virtual tour that may be relevant to the digital resource. In some cases, the data processing system can select a virtual tour based on a location of the client device. In some cases, the data processing system can select the virtual tour based on historical performance data associated with the client device. For example, if the client device, or user thereof, previously interacted positively with a virtual tour for a hotel or restaurant having certain attributes (e.g., location, type of cuisine, amenities, price, etc.), then the data processing system can select a similar virtual tour. In some cases, the content selection system can select the virtual tour using similar performance data. For example, the data processing system can attribute the historical interaction and performance data to a virtual tour or provider of the virtual tour, and provide the feedback to the content selection system for further processing. The content selection system can incorporate the performance data as a conversion of the supplementary content item 142.

At ACT 154, the data processing system can transmit the viewer application to the client device. The data processing system can transmit the viewer application to cause the viewer application to execute in a content slot on the digital resource rendered by the client application. The data processing system can execute or cause the execution of a priority caching function. The priority caching function can cause the transmission and download of high priority portion of the virtual tour before lower priority portion of the virtual tour so as to minimize or reduce delays or latency in rendering the digital resource or performance of other tasks on the client application or client device. For example, the viewer application can user the priority caching function to determine a number of frames to download, and request those frames from the data processing system. In another example, a content streamer of the data processing system can use the priority caching function to determine a number of frames to transmit to the viewer application, and transmit those frames to the viewer application. In some cases, the content streamer and viewer application can interface or communicate with one another to execute the priority caching function and determine the number of frames and which frames of the virtual tour to download and render. The progressive caching function can be triggered each time another portion of the virtual tour is downloaded or transmitted. For example, the progressive caching function can be triggered or invoked responsive to controller input, branching, 360 degree views, reverse, or stepping ahead in a virtual tour.

The viewer application can establish a controller to control rendering of the virtual tour. the viewer application can overlay the controller on a portion of the virtual tour, or some other portion of the content slot. The viewer application can present the controller as a graphical user interface element, button, or other type of widget. A user can interact with the controller via a user interface, such as mouse input, touch input, gestures, voice input, etc.

The controller can detect interaction or input that occur outside of the content slot itself. For example, a user can input a mouse-down event on a portion of the client application that falls outside the content slot. The client application can detect this mouse-down event and pass it to the controller, which can interpret this mouse-down event as an interaction with the viewer application and virtual tour. In some cases, the mouse-down event may initially occur on the controller, but the mouse can be moved outside of the slot. However, the controller (e.g., via client application) can continue to track the movement of the mouse and control playback of the virtual tour accordingly.

Figure 1C:
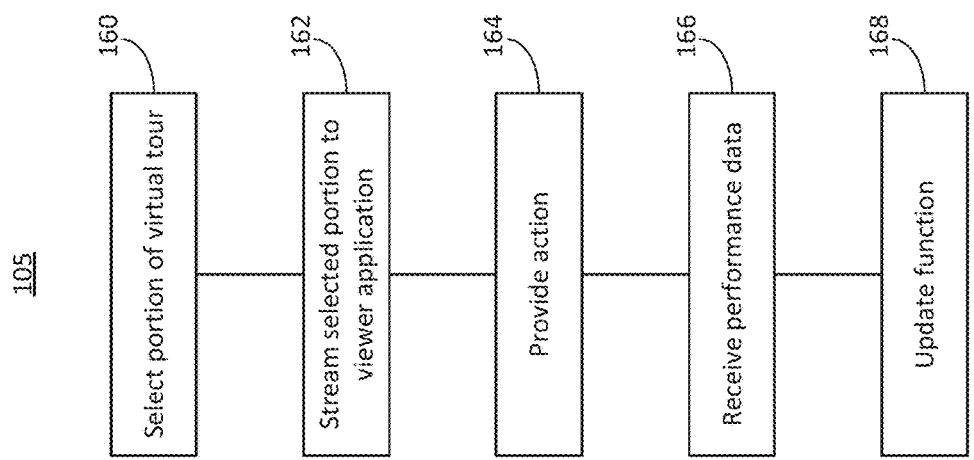
FIG. 1C depicts a flow chart for updating a function used to deliver predetermined virtual tours for real-time delivery, in accordance with an implementation.

FIG. 1C depicts a flow chart for updating a function used to deliver predetermined virtual tours for real-time delivery, in accordance with an implementation. The method 105 can be performed by one or more system or component depicted in FIG. 1A, including, for example, a data processing system or a viewer application. In brief overview, the method 105 can include selecting a portion of a virtual tour at ACT 160. At ACT 162, the method can include streaming the selected portion of the virtual tour to the viewer application. At ACT 164, the method can include providing an action. At ACT 166, the method can include receiving performance data. At ACT 168, the method can include updating a function.

Still referring to FIG. 1C, and in further detail, the method 105 can include selecting a portion of a virtual tour at ACT 160. The data processing system can use a progressive caching function to select a certain number of frames or a certain portion of the virtual tour to transmit to a client device for rendering in a viewer application. The function can indicate to select 4-6 frames. The function can be configured to select a certain number of frames based on computing characteristics. For example, if a mobile device on a 3G cellular network, the function can select 4 frames. However, if a laptop computing device on a WIFI network with greater than 10 megabytes/second bandwidth, then the function can select 6 frames. In another example, if the digital resource being rendered in the client application contains a large amount of data or multimedia content or streaming video content with a high resolution, then the function can select fewer frames, such as 4 frames.

In some cases, the number of frames selected by the function can be based on the virtual tour itself so as to facilitate a smooth playback or user experience of the virtual tour. For example, the number of frames selected can correspond to a linear path of a certain duration or portion in the virtual tour that provides a seamless user experience (e.g., from the entrance of a hotel to a lobby desk in the hotel lobby or other branch or stopping location in the hotel).

At ACT 162, the method can include streaming the selected portion of the virtual tour to the viewer application. The data processing system can transmit the frames that are selected, such as the first 4-6 frames. The data processing system can send batches of frames based on the limit of frames selected at ACT 160. For example, the data processing system can send the group of frames one after the other such that the viewer application has the next group of frames to render upon receipt of the first group of frames.

At ACT 164, the method can include providing an action. The viewer application can request an action from the data processing system, or the data processing system can select and provide the action. In some cases, the virtual tour can be configured with actions. The actions can refer to or include call-to-action prompts, redirects, call functionality, video functionality, booking functionality, or other types of digital actions. In some cases, the action can invoke or launch different client applications or viewer applications.

At ACT 166, the method can include receiving performance data. The data processing system can receive performance data associated with how the virtual tour performed. The data processing system can receive performance data associated with how the action performed or whether the action was triggered by the user. The performance data can include, for example, at least one of a type of interaction, an interaction time, a mouse-down time, or a total view time.

At ACT 168, the method can include updating a function. If the performance data indicates favorable or good performance, then the data processing system can determine to not update the function. If the performance data was poor or below a threshold, then the data processing system can update the function so as to improve subsequent performance of the virtual tour or renders of virtual tours on the client device.

Figure 2:
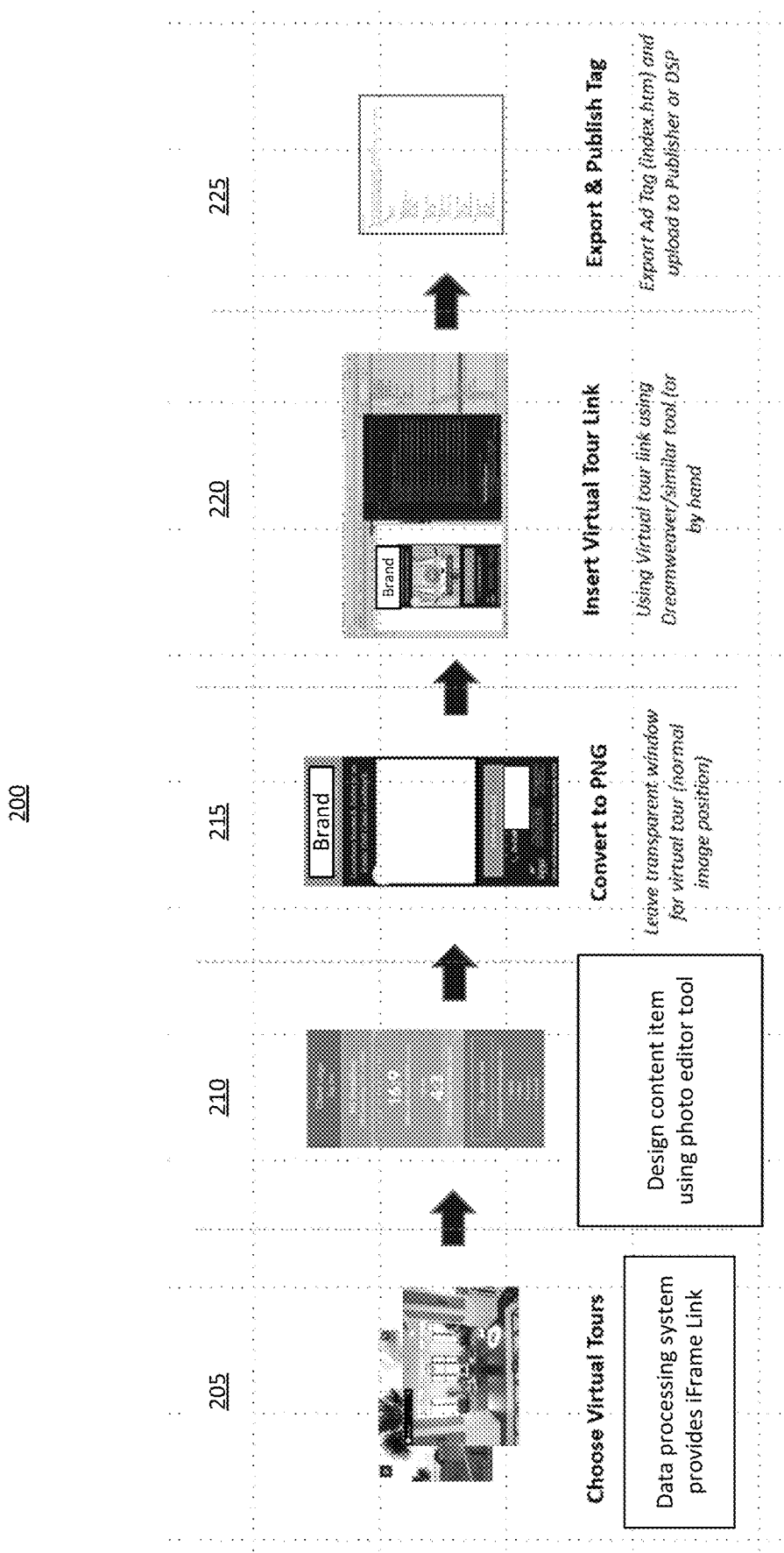
FIG. 2 depicts a flow diagram of an illustrative process for integrating predetermined virtual tours for real-time delivery on third-party resources, in accordance with an implementation.

FIG. 2 depicts a flow diagram of an illustrative process for integrating predetermined virtual tours for real-time delivery on third-party resources, in accordance with an implementation. The method 200 can be performed by a data processing system or client device depicted in FIG. 1A. The method 200 can include choosing a virtual tour at ACT 205. At ACT 210, the method can include designing a content item for the virtual tour. The data processing system can convert the advertisement with the virtual tour to static images in any format, such as a PNG format, at ACT 215. At ACT 220, the data processing system can provide a link for the virtual tour. At ACT 225, the data processing system can export and publish a tag to be inserted in an advertisement that can be delivered by the content selection system 104 responsive to an advertisement request.

FIGS. 3A-3E depict illustrations of predetermined virtual tours delivered for third-party resources, in accordance with implementations. The virtual tour 120 can be provided by one or more system or component depicted in FIG. 1A. For example, a viewer application 130 can render the virtual tour 120. The viewer application 130 can be executed in a content slot 140 on a digital resource. The virtual tours can be integrated with a content item 124 and include a content frame 302 around the virtual tour 120. The viewer application 130 can include interactivity functions (e.g., icon 128 of a controller) that allow a user to click and drag to look around or pan around the virtual tour. The virtual tour 120 can include chevrons or strike points that provide a predetermined path.

Figure 3A:
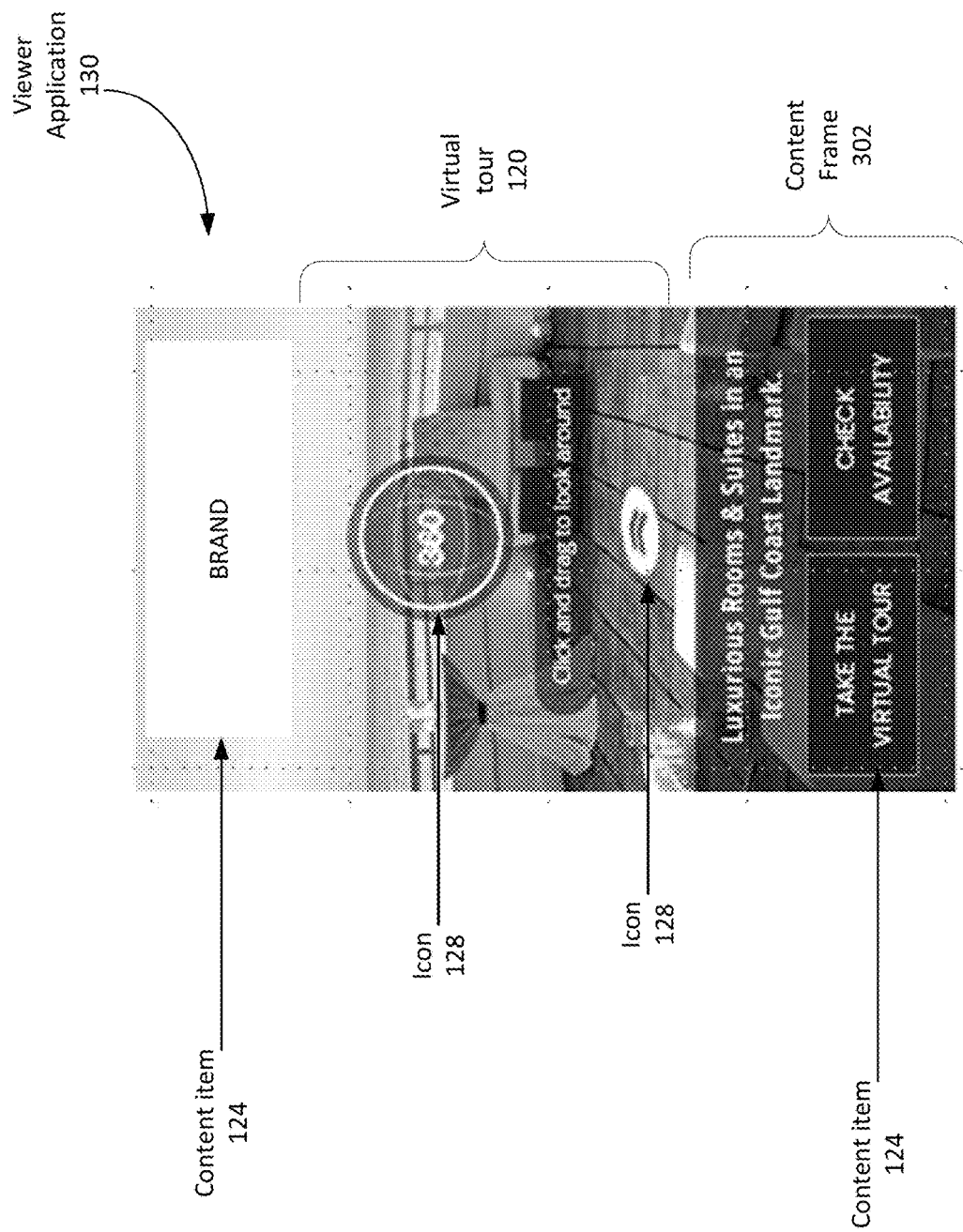
FIGS. 3A-3E depict illustrations of predetermined virtual tours delivered for third-party resources, in accordance with implementations.
Figure 3B:
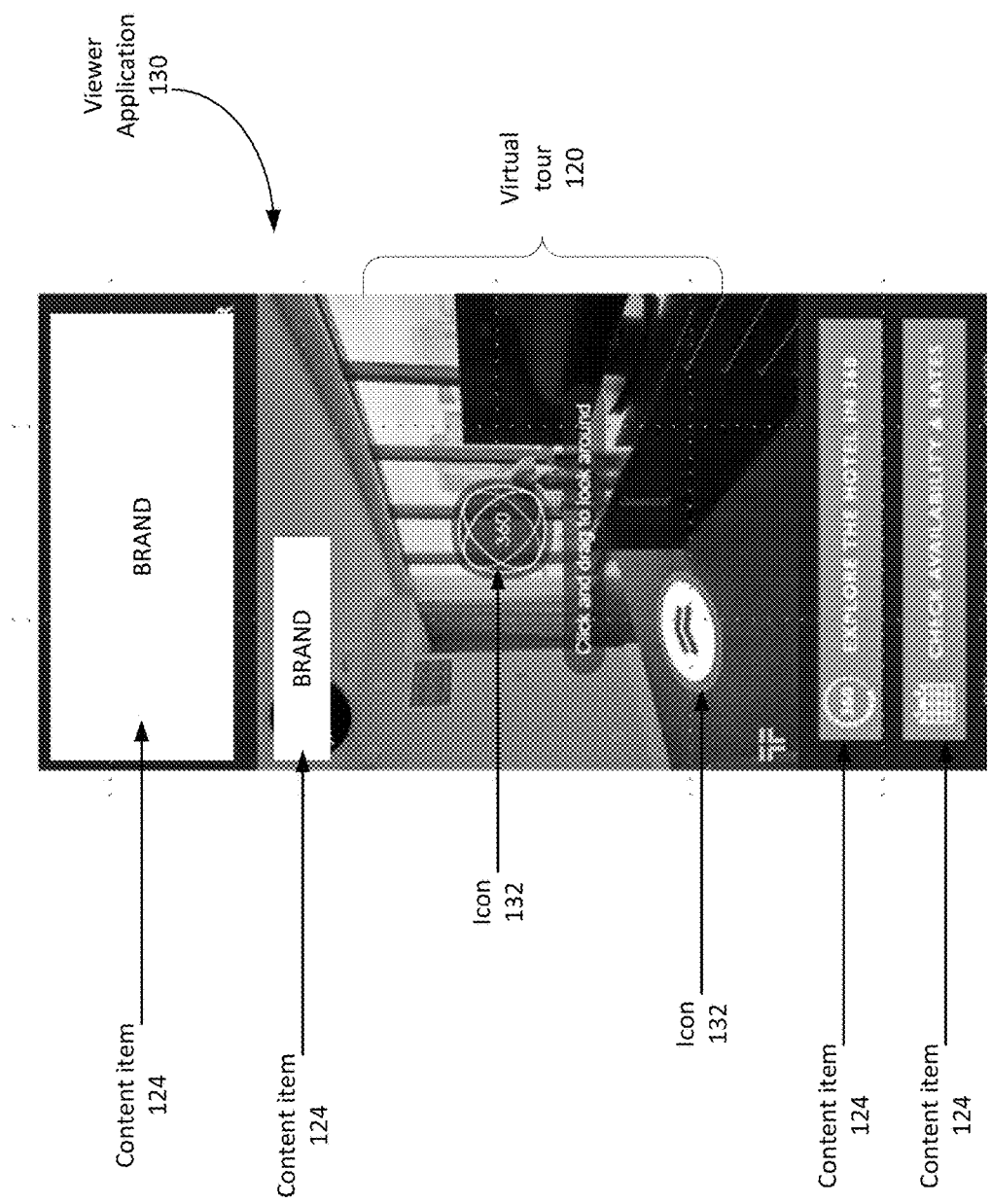
Figure 3C:
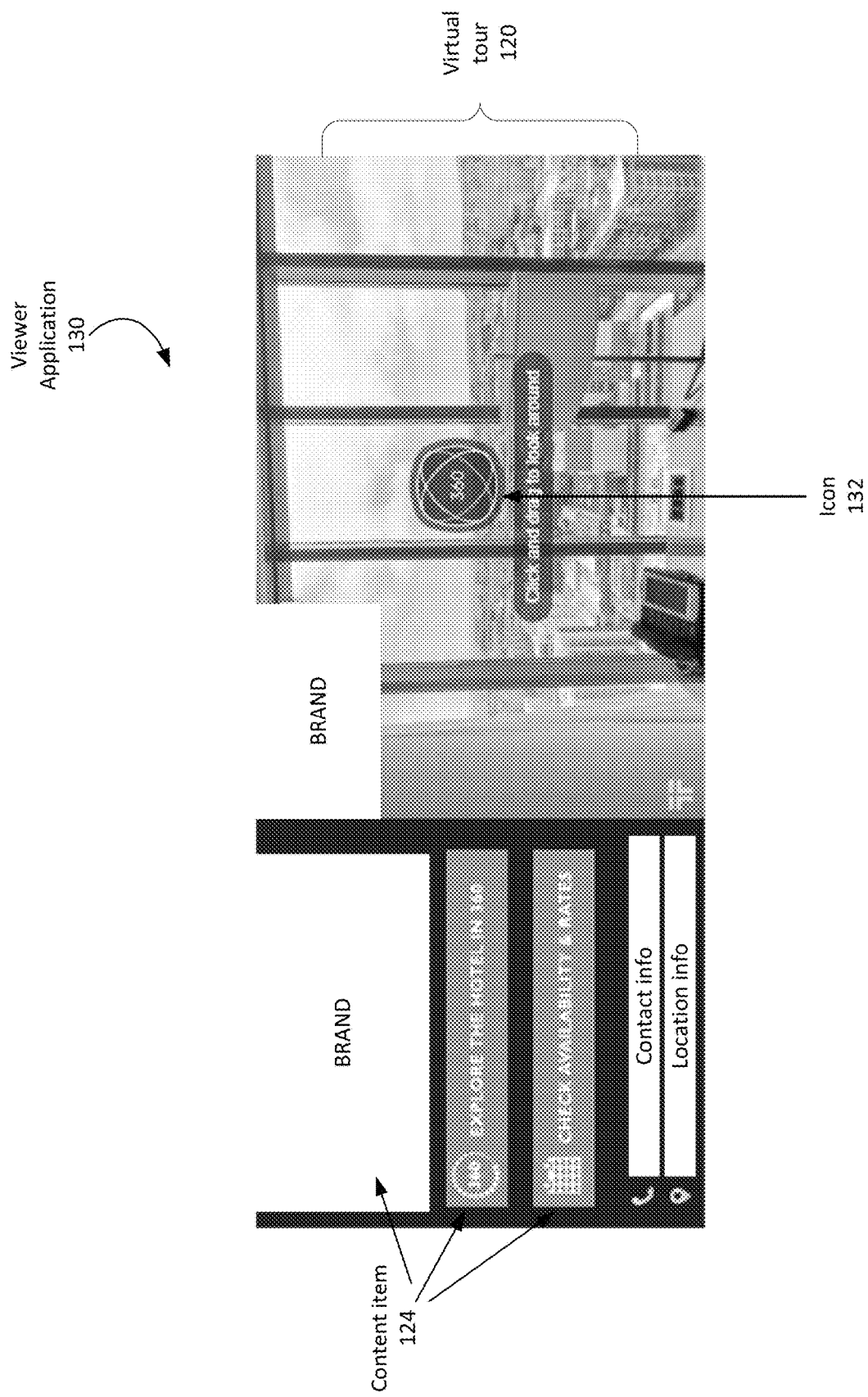
Figure 3D:
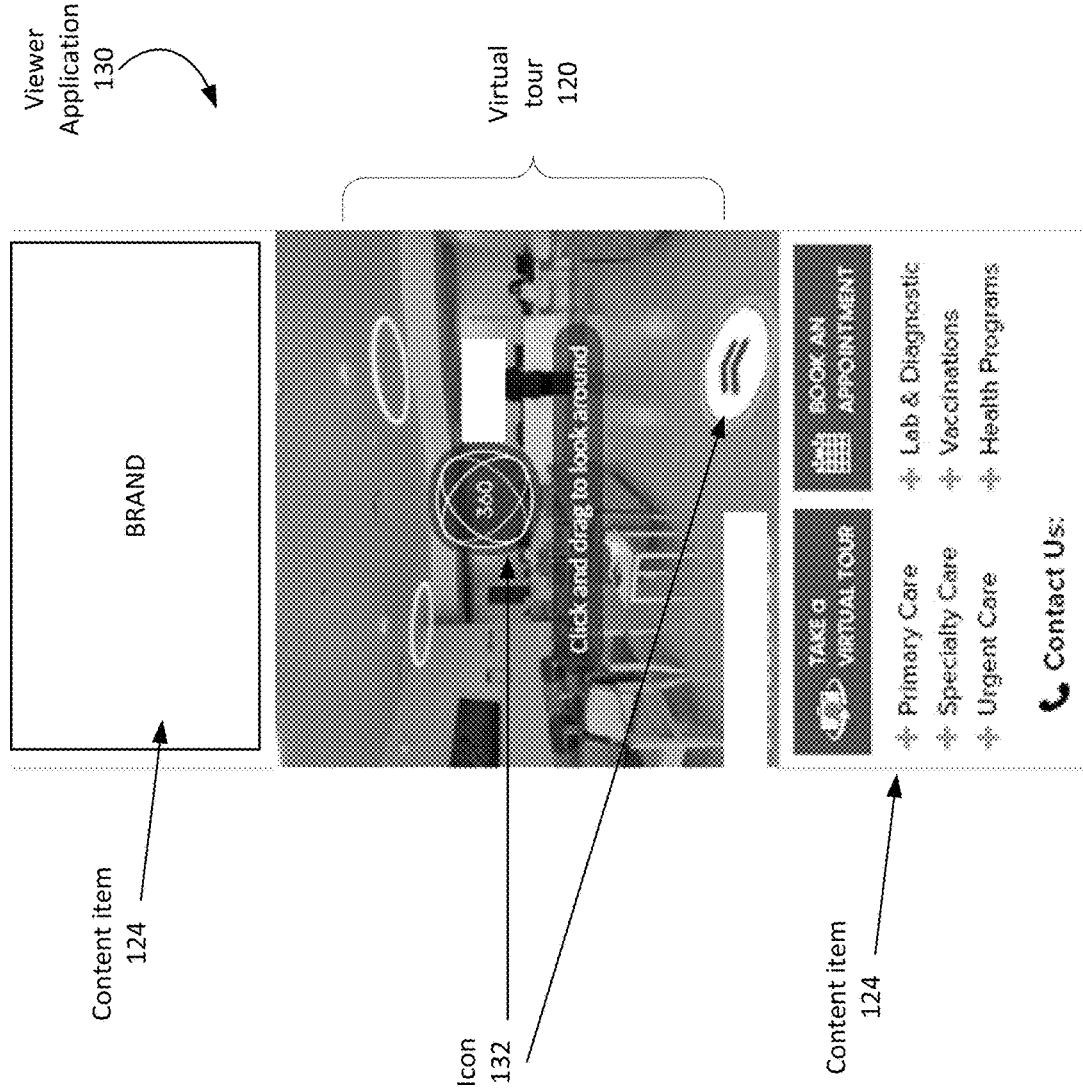
Figure 3E:
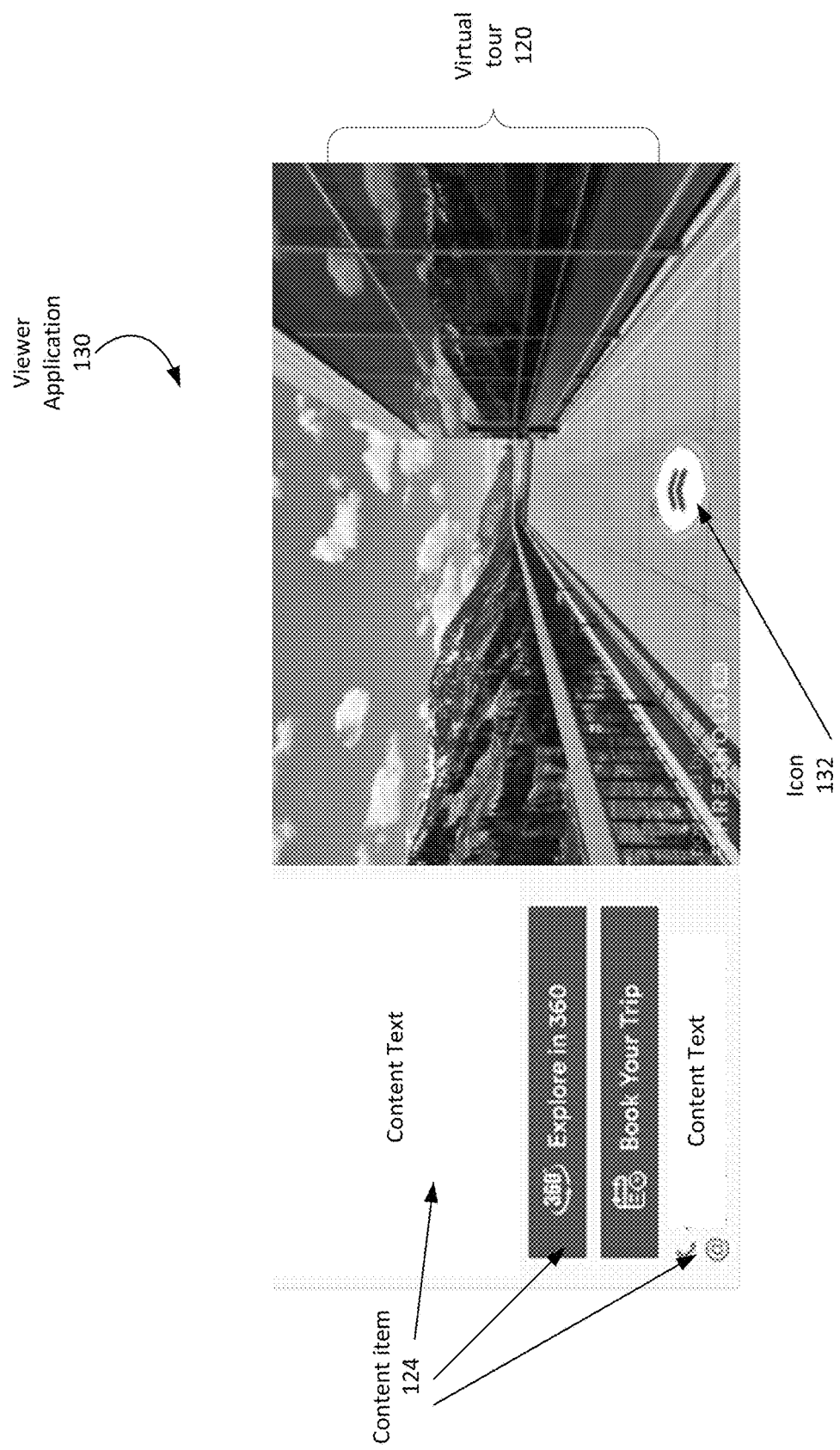

For example, the illustrated display content item can embed a virtual tour as shown in FIG. 3A. The viewer application 130 can have limited features or functions to improve efficiency of delivery, while increasing engagement and improving user experience. The virtual tour 120 can be embedded as an add-on for an online advertisement campaign. The user can control the experience by controlling the virtual tour 120. The integrated or embedded virtual tour 120 can provide an eye-catching and effective media type that is efficient and improves engagement. For example, the virtual tour 120 can be configured to integrate in a standard advertisement slot which a standard advertising system can fulfill responsive to a standard advertisement request.

FIG. 4 depicts example dimensions for virtual tours delivered on third-party resources, in accordance with implementations. The dimensions can correspond to content slots 140. The slots 140 can render the virtual tour. The viewer application can launch or execute within the content slot 140. The virtual tour and viewer can be integrated with various slot sizes, as depicted in FIG. 4. Ad slot sizes can have dimensions such as in pixels or any other units. Example dimensions can include 300×600, 160×600, 336× 280, 240×400, 300×250, or 720×300.

Figure 5:
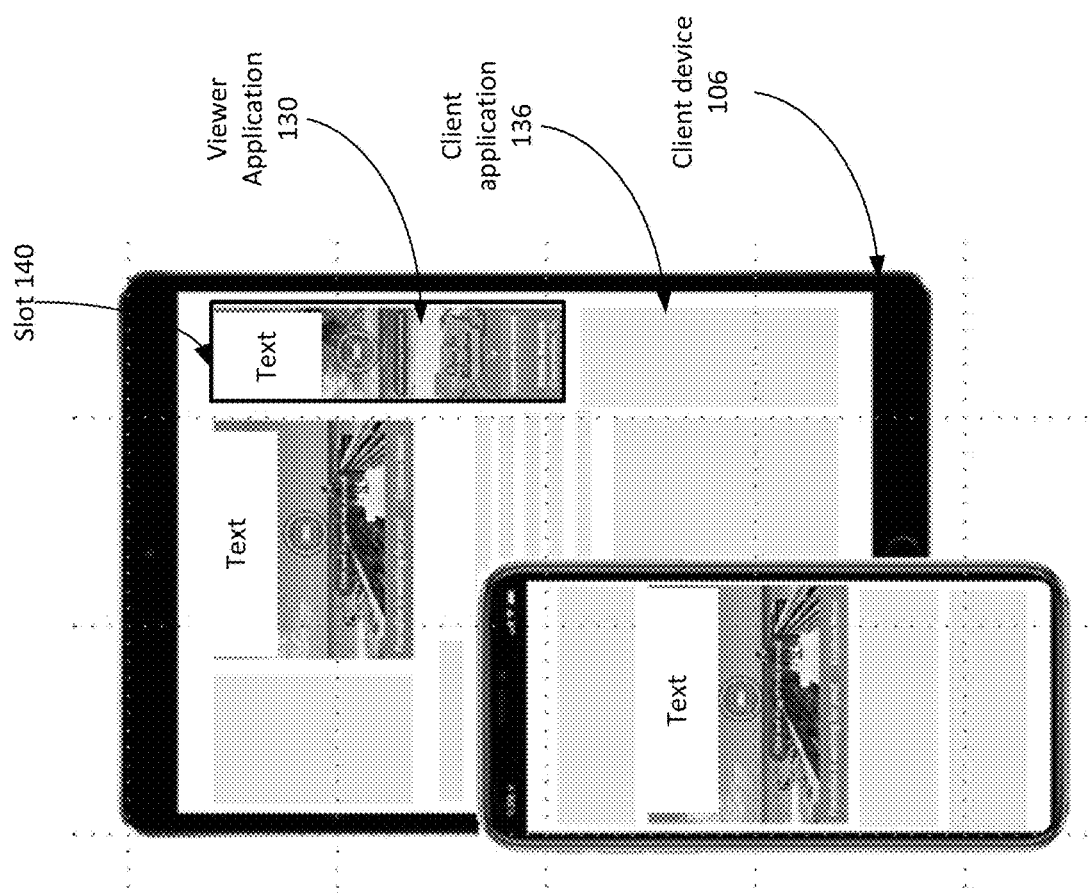
FIG. 5 depicts an example of a client device rendering a predetermined virtual tour delivered on a third-party resources, in accordance with implementations.

FIG. 5 depicts an example of a client device rendering a predetermined virtual tour delivered on a third-party resources, in accordance with implementations. Types of client devices 106 can include a smartphone, tablet, laptop computer, desktop computer, wearable devices, etc. The technical solution can provide virtual tours in an ad-enabled viewer provided by the data processing system 102. The data processing system 102 can provide a plug-in that allows for an ad-enabled viewer to be integrated with a standard advertisement design.

The data processing system 102 can provide performance data, such as number of unique users, views, and engagement metrics for each advertisement. Example metrics can include campaign reach (e.g., number of pages and views per page), unique users, tour views, engagement rate, click-through-rate, lift in sales, lift in leads, and cost per lead.

Figure 6:
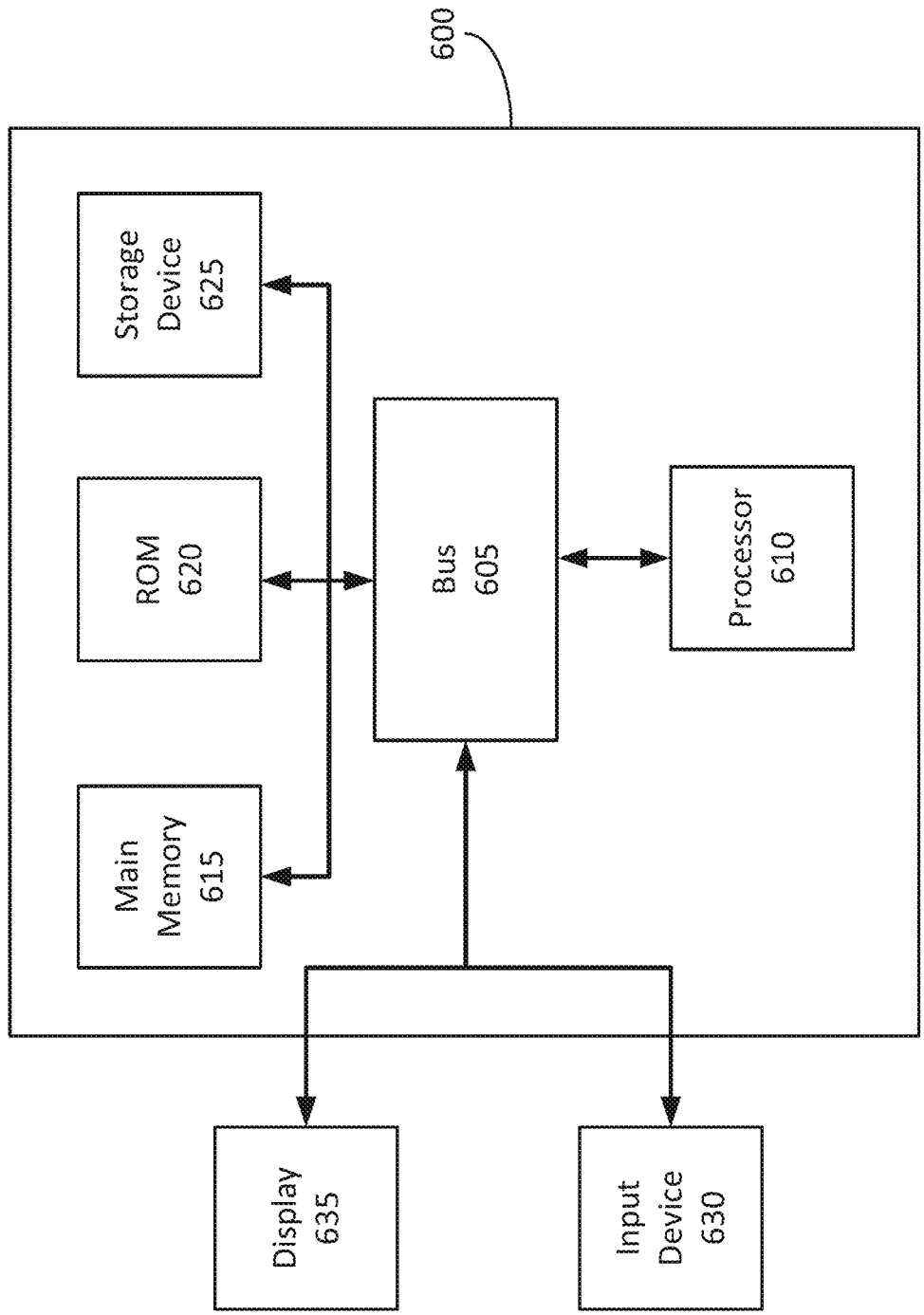
FIG. 6 is a block diagram illustrating an architecture for a computer system that can be employed to implement elements of the systems, flows and methods described and illustrated herein.

FIG. 6 is a block diagram of an example computer system 600 that can be used to implement or perform one or more functionality or element of this technical solution. The computer system or computing device 600 can include or be used to implement one or more component or system depicted in FIG. 1A, including, for example, the data processing system 102, or its components such as the content streamer or viewer delivery agent, or client device 106. The computing system 600 includes at least one bus 605 or other communication component for communicating information and at least one processor 610 or processing circuit coupled to the bus 605 for processing information. The computing system 100 can also include one or more processors 610 or processing circuits coupled to the bus for processing information. The computing system 100 also includes at least one main memory 615, such as a random access memory (RAM) or other dynamic storage device, coupled to the bus 605 for storing information, and instructions to be executed by the processor 610. The main memory 615 can be or include the memory 615. The main memory 615 can also be used for storing virtual machine information, hardware configuration information of the virtual machine, software configuration information of the virtual machine, IP addresses associated with the virtual machine or other information during execution of instructions by the processor 610. The computing system 100 may further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions. The storage device 625 can include or be part of the memory 615.

The computing system 100 may be coupled via the bus 605 to a display 635, such as a liquid crystal display, or active matrix display, for displaying information to a user. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 can be part of the data processing system 102, the client device 106, or other component of FIG. 1A.

The processes, systems and methods described herein can be implemented by the computing system 100 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 100 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 1A, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a client application through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation.

Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A system for integrating virtual tours on digital resources, comprising:
    a data processing system comprising at least one processor, coupled to memory, to:
    receive, via a network, a call generated by a client application executed on a client device responsive to a refresh of a digital resource;
    identify, based on the call, a request for content for display in a content slot on the digital resource having a content slot size;
    transmit, to the client device responsive to the request, a viewer application configured to execute a priority caching function in the content slot to:
        download, based on the priority caching function and a computing characteristic of the client device, a first portion of a virtual tour;
        render the first portion of the virtual tour via the content slot; and
        establish, for the rendered first portion of the virtual tour downloaded based on the priority caching function, a controller that controls rendering of the virtual tour in response to a detection of an interaction on the digital resource outside the content slot.

2. The system of claim 1, wherein the data processing system is further configured to:
    receive the call generated by the client application responsive to the client application receiving an instruction to request the content from a content selection system separate from the data processing system and the client device.

3. The system of claim 2, wherein the call includes an identifier corresponding to the virtual tour.

4. The system of claim 1, wherein the data processing system is further configured to:
    transmit the viewer application to the client application with a command to cause the viewer application to automatically play the virtual tour independent of any detection of interactions on the digital resource.

5. The system of claim 1, wherein the virtual tour comprises a plurality of panoramic images captured by one or more cameras and connected to form a sequence frames, and the viewer application is configured to traverse the virtual tour along a path taken by the one or more cameras to prevent branching events off of the path.

6. The system of claim 1, wherein the data processing system is further configured to:
    select, based on the priority caching function and the computing characteristic, a highest priority portion of the virtual tour for transmission to the viewer application; and
    select, subsequent to the selection of the highest priority portion, a second highest priority portion of the virtual tour for transmission to the viewer application.

7. The system of claim 6, wherein the computing characteristic comprises a bandwidth of a connection via the network between the client device and the data processing system.

8. The system of claim 1, wherein the controller is further configured to:
    provide an icon for display via the content slot; and
    detect, via a user interface of the client device, the interaction on the digital resource based on a click-down event corresponding to the icon.

9. The system of claim 1, wherein the controller is further configured to:
    adjust a direction of the virtual tour responsive to detection of the interaction.

10. The system of claim 1, wherein the controller is further configured to:
    pause the virtual tour responsive to the detection of the interaction; and
    invoke, responsive to the pause, a 360 degree view function of the virtual tour.

11. The system of claim 1, wherein the data processing system is further configured to:
    provide, to the viewer application, a content item comprising a single frame that is separate from the virtual tour to cause the viewer application to overlay the content item on the virtual tour at a time stamp as the virtual tour is played in the content slot, the content item configured to redirect the client application to at least one of a second virtual tour or a second digital resource.

12. The system of claim 1, wherein the data processing system is further configured to:
    receive, from the viewer application, performance data corresponding to the render of the virtual tour on the digital resource; and
    modify, based on the performance data, the priority caching function to adjust a priority of one or more portions of the virtual tour responsive to the performance data.

13. The system of claim 12, wherein the performance data includes at least one of a type of interaction, an interaction time, a mouse-down time, or a total view time.

14. A method for integrating virtual tours on digital resources, comprising:
- receiving, by a data processing system comprising at least one processor coupled to memory, via a network, a call generated by a client application executed on a client device responsive to a refresh of a digital resource;
- identifying, by the data processing system based on the call, a request for content for display in a content slot on the digital resource having a content slot size;
- transmitting, by the data processing system to the client device responsive to the request, a viewer application configured to execute a priority caching function in the content slot;
- transmit, by the data processing system to the viewer application based on the priority caching function and a computing characteristic of the client device, a first portion of a virtual tour to cause the viewer application to:
  - render the first portion of the virtual tour via the content slot; and
  - establish, for the rendered first portion of the virtual tour downloaded based on the priority caching function, a controller that controls rendering of the virtual tour in response to a detection of an interaction on the digital resource outside the content slot.

15. The method of claim 14, comprising:
- receiving, by the data processing system, the call generated by the client application responsive to the client application receiving an instruction to request the content from a content selection system separate from the data processing system and the client device.

16. The method of claim 15, wherein the call includes an identifier corresponding to the virtual tour.

17. The method of claim 14, comprising:
- transmitting, by the data processing system, the viewer application to the client application with a command to cause the viewer application to automatically play the virtual tour independent of any detection of interactions on the digital resource.

18. The method of claim 14, wherein the virtual tour comprises a plurality of panoramic images captured by one or more cameras and connected to form a sequence frames, and the viewer application is configured to traverse the virtual tour along a path taken by the one or more cameras to prevent branching events off of the path.

19. The method of claim 14, comprising:
- selecting, by the data processing system based on the priority caching function and the computing characteristic, a highest priority portion of the virtual tour for transmission to the viewer application; and
- selecting, by the data processing system subsequent to the selection of the highest priority portion, a second highest priority portion of the virtual tour for transmission to the viewer application.

20. The method of claim 19, wherein the computing characteristic comprises a bandwidth of a connection via the network between the client device and the data processing system.

* * * * *